Jan. 6, 1959    H. A. TIESLAU    2,867,341
LOAD CARRIAGE FOR A ROAD VEHICLE
Filed Jan. 4, 1957    3 Sheets-Sheet 1
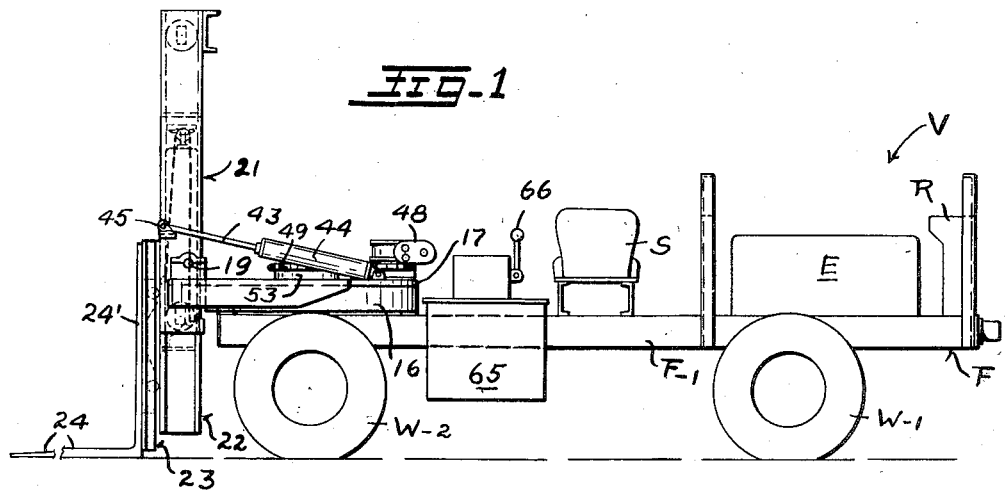
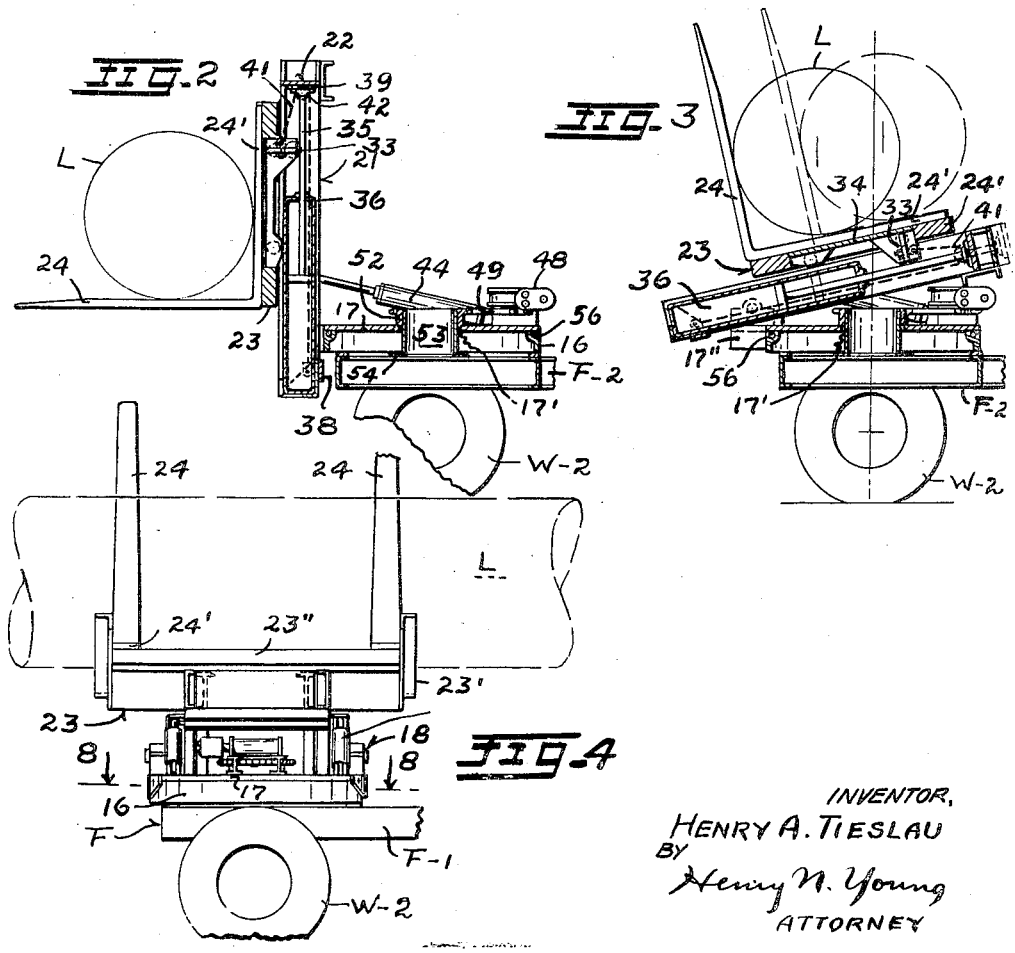
INVENTOR,
HENRY A. TIESLAU
BY
Henry N. Young
ATTORNEY

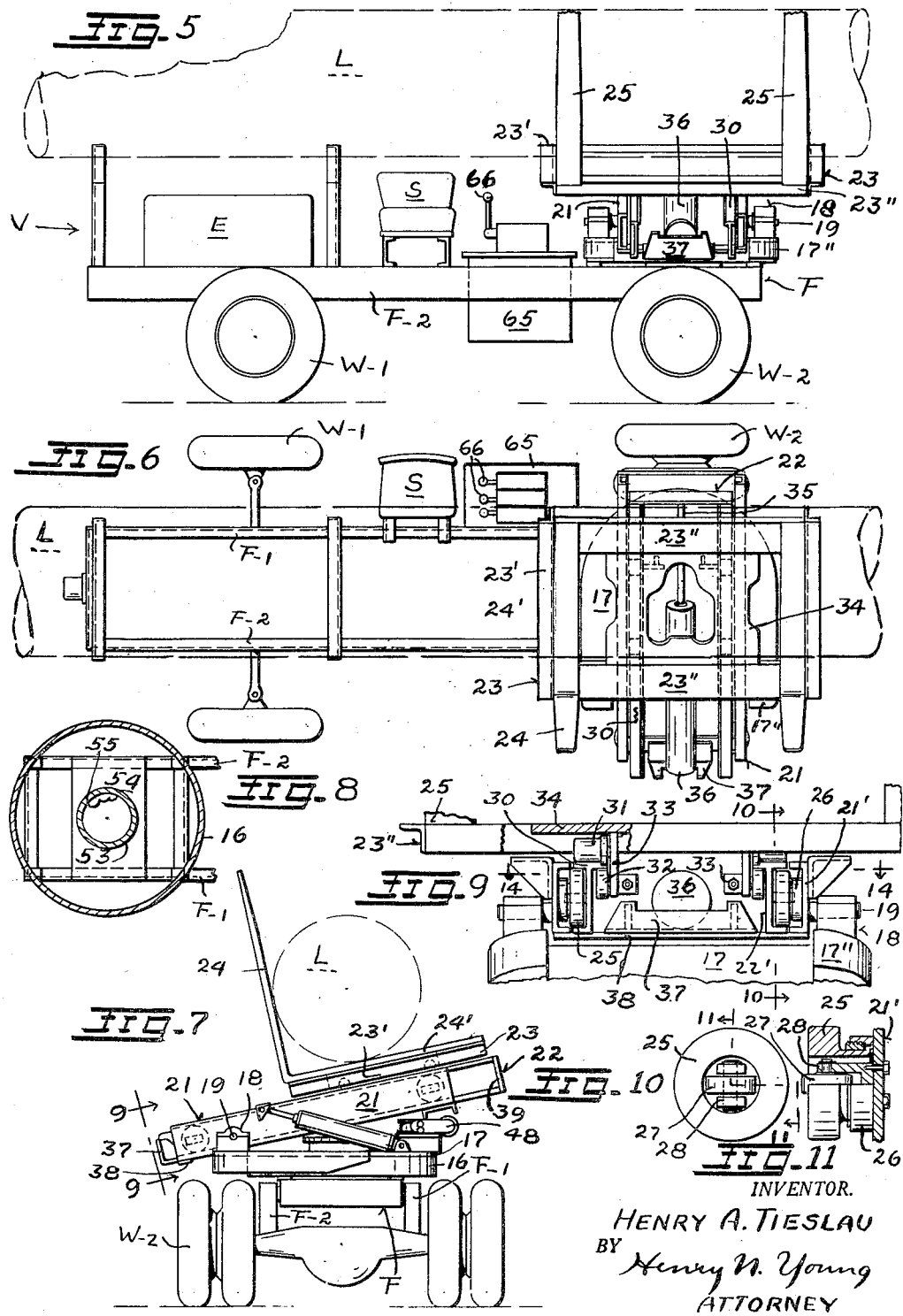

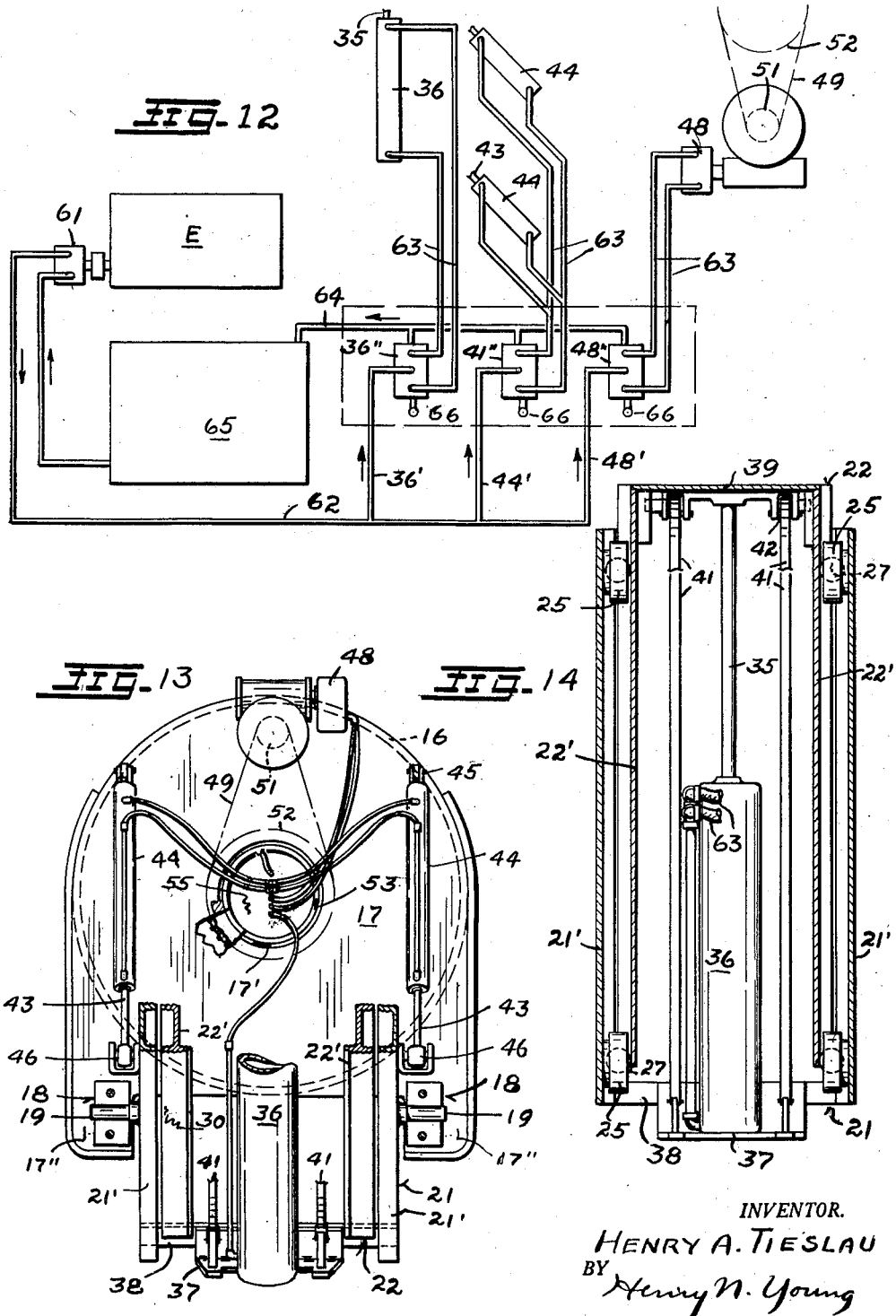

United States Patent Office 2,867,341
Patented Jan. 6, 1959

2,867,341

LOAD CARRIAGE FOR A ROAD VEHICLE

Henry A. Tieslau, Berkeley, Calif.

Application January 4, 1957, Serial No. 632,588

4 Claims. (Cl. 214—672)

The invention relates to a vehicle provided with a carriage for supporting and transporting elongated load articles, such as poles and pipes, along highways while they are disposed in alignment with the line of travel of the vehicle, yet may utilize the carriage to pick up or deliver such articles while they are disposed across its said line of travel.

Understanding that an elongated article supported on a transporting vehicle across the longitudinal line of travel of the vehicle and longer than the width of the vehicle will usually require a wider zone for its movement than is normally available, as on a highway or between fixed structures, and that a side loading of a heavy object on a vehicle may laterally tip a vehicle, the load-engaging carriage of the present vehicle is arranged for use to pick up or deliver a load of one or more elongated articles while they are disposed across the travel line of the vehicle, and yet dispose the load above and parallel to said line during its transportation on the vehicle. Accordingly, it is a primary object of the present invention to provide a vehicle having a load-receiving carriage which is usable to pick up and convey and deliver an elongated load in the described manner.

Another object of the invention is to provide a vehicle having its load-mounting carriage arranged for functioning as a lift fork in picking up or delivering load articles at points variously related to the ground level.

A further object is to provide a turntable support of the carriage on the support vehicle for its rotary adjustment about an upright axis for supporting the load in its different possible relations to the vehicle axis.

An added object is to provide the vehicle with a particularly effective power-operated means for controlling the positioning of the carriage and the actuating of its lift.

The invention possesses other objects and features of advantage, some of which, with the foregoing, will be set forth or be apparent in the following description of a typical embodiment thereof, and in the accompanying drawings, in which, Figure 1 is a right-side elevation of a vehicle provided with the load-carrying support of my invention, the load carriage thereof being disposed for application to pick up an elongated load at the rear vehicle end.

Figure 2 is a fragmentary view indicating an engaged and lifted load on the carriage.

Figure 3 shows the carriage of the vehicle tilted back toward a position in which the load is intersected by the axis of rotation of the carriage.

Figure 4 is a right-side view showing the load swung to overlie the longitudinal line of the vehicle.

Figure 5 is a left-side view of the vehicle shown as carrying a load longitudinally positioned thereon.

Figure 6 is a plan view of the vehicle structure shown in Figure 5.

Figure 7 is a rear view of the vehicle in load-transporting condition.

Figure 8 is a fragmentary plan section taken at the line 8—8 in Figure 4.

Figure 9 is an enlarged fragmentary view taken from the line 9—9 in Figure 7.

Figure 10 presents an enlarged side view of a support roller as viewed from the line 10—10 in Figure 9.

Figure 11 is a partly sectional view taken at the line 11—11 in Figure 10.

Figure 12 is a diagrammatic showing of the hydraulic control system for the load-carrying carriage.

Figure 13 is a fragmentary plan view of a turntable assembly of the vehicle.

Figure 14 is an enlarged fragmentary section taken generally at the line 14—14 in Figure 9.

A present vehicular support for elongated load elements L is particularly shown as provided in association with a usual type of wheeled vehicle V comprising a self-propelled truck having dirigible front wheels W-1 and rear wheels W-2 cooperatively and suitably carrying a rigid chassis frame F having fixedly and laterally spaced right and left side beams F-1 and F-2. At the forward end thereof, the frame F mounts a suitable power source, such as an internal combustion engine E and an associated radiator E, the engine being suitably connected with the front and/or rear vehicle wheels for a driving actuation of the vehicle through a suitable power transmission means (not shown). For facilitating the travel operation of the vehicle and the control of its loading and unloading, the operator's seat S is mounted on the chassis intermediately thereof and outwardly of the right-side chassis side F-1 in position for a cross-wise seating of the operator thereon for actuating the appropriate controls.

It will now be noted that the rearward end portions of the chassis frame sides F-1 and F-2 cooperatively and fixedly mount an axially short tubular element 16 diametrically spanning the frame portion thereat and supporting a turntable platform 17 in suitably swiveled non-tilting relation thereto for its centered rotation about a fixed upright axis perpendicularly intersecting the longitudinal vehicle axis. The plate of the turntable 17 is provided with a central opening 17' and is of circular outline except for spaced parallel extensions or ears 17" which mount bearings 18 comprising pillow-blocks and removable cap-blocks cooperatively providing coaxial bearings for the journaled engagement therein of trunnion pins 19 which extend outwardly and fixedly from the opposite sides of a rectangular tilt-base element 21 of rigid structure for hingedly attaching the latter to the turntable platform 17 for its swinging about an axis perpendicular to the turntable axis in laterally spaced relation thereto, said element comprising the base member of the load-mounting carriage assembly.

In its present embodiment, the element 21 essentially comprises a rigid open rectangular frame having parallel side members 21' of channel section with their corresponding side flanges extending toward each other in common planes and having the trunnions 19 mutually aligned and fixed to their webs at a line adjacent one frame end for providing a hinged frame connection with the bearings 18 provided by the turntable 17, the connection being such that the frame 21 is tiltable between the upright position shown for it in Figures 1 and 2 and its generally prone position in overlying relation to the platform 17 brought out in Figures 3 and 7. A rigid rectangular frame element 22 is rollably engaged and guided by and between the sides 21' of the tilt frame 21 for its adjustment longitudinally from the position of Figure 7, in which position it is shown as extending slightly beyond both ends of the frame 21. A rectangular frame element 23 is rollably mounted on the element 22 for solely longitudinal adjustments along it, and comprises a movable base unitarily carrying a pair of fork arms 24 extending integrally and perpendicularly from fork-base arms 24' which are replaceably fixed to the outer faces of the mutually parallel side members 23' connected by end members 23", the frame 23 being somewhat wider than the frame 21 which slidably receives the frame 22.

By particular reference to Figures 9 and 10 and 11 and 14, it will now be noted that the side member 22' of the intermediate frame element 22 provide uniform guide channels in opposition to the channels of the sides 21' of the tile-base element 21 for operatively receiving within them anti-friction rollers to facilitate a guided reciprocation of the element 22 with respect to the mutually parallel tilt frame 21 which mounts it. In the present structure, rollers 25 have hub portions thereof swiveled within annular bosses 26 extending from the webs of the tilt-frame sides 21' near the different extremities thereof for their rolling engagement with and between the flanges of the sides 22' of the frame 22. Rollers 27 are mounted on the frame sides 21' for rotation about axes perpendicular to the axes of rotation of the rollers 25 and parallel to the plane of the frames for engaging the webs of the frame sides 22' for completing the reciprocative centering of the frame 22 within the frame 21; as shown, the rollers 27 are mounted in axial slots provided in fixed studs 28 extending coaxially within and from the bosses 26.

At the opposite face of the frame element 22 from the turntable 17, the side members 22' of the element are of T section whereby their mutually coplanar flange portions provide a track 30 of uniform width on which the fork-carrying frame 23 is reciprocably supported and held by and between upper and lower rollers 31 and 32 mounted on pairs of arms 33 depending from the frame 23 opposite their inner track edges. As particularly shown in Figures 6 and 9, the arms 33 depend from a plate 34 which is fixed to and between the end members 23" of the fork-carrying frame 23 in longitudinally extending relation to the frame.

It will now be noted that the unitarily associated tile-base element 21 and intermediate element 22 and fork-mounting element 23 cooperatively provide the load-receiving carriage assembly having said elements, relatively reciprocable in their described relation while the assembly is angularly adjustable with reference to the turntable 17. For picking up and transporting a load, the arrangement is essentially such that when the tilt frame 21 of the carriage is upright, the fork lift arms 24 may be disposed at an appropriate level (Figure 1) for their insertion beneath load elements L positioned generally horizontally at or above the ground level, by their horizontal movement with the vehicle, after which the frame 21 having the fork-supported load first moved sufficiently upwardly on it (Figure 2) may be swung over the turntable plate 17 about the trunnions 19 to provide a forked-cradled disposition of the load in overlying position (Figure 3) across the turntable, following which a rotation of the turntable about its upright axis is arranged to dispose the load longitudinally of the vehicle (Figure 4) for its transportation by the vehicle. It will be understood that the cycle of loading operations as now generally described and progressively disclosed in Figures 1 to 4 inclusive, may be reversed for releasing a transported load at any desired level within the range of adjustment of the forked arms 24 with respect to the tilt-base frame 21.

As brought out in Figures 2 and 3 and 6 and 13 and 14, the position of the intermediate frame 22 with respect to the frame 21 is under control of a piston rod 35 extending from a hydraulic cylinder 36 which has a double-acting piston and is attached to and extends longitudinally in the frame space from a base 37 provided on a cross-member 38 comprising the end of the frame 21 nearest its tilt axis, with the end of the piston rod fixed to the opposite cross-member end 39 of the frame 22.

The arrangement is essentially such that the position of the frame 22 with respect to the frame 21 is adjustable under control of the piston rod 35. Means are also provided whereby the position of the fork frame 23 with respect to the frames 21 and 22 is automatically changed as the frame 22 is moved in and along the frame 21; in the present arrangement, flexible cables 41 extend from the rearward arms 33 of the frame 23 around sheaves 42 mounted at the end 39 of the frame 22 to anchorages at the end 38 of the frame 21, whereby the fork assembly is automatically and correspondingly moved along the frame 22 as the latter is moved along the tilt frame 21. It is to be noted that the provision and control of the intermediate frame 22, while the tilt frame 21 is upright, provides for a maximum range of height positionings of the fork arms 25 for the loading and unloading thereof, while the arms are in a horizontal position.

The angular relation of the carriage assembly, comprising the tilt-frame 21 and the elements mounted thereon, to the turntable 17 is arranged to be adjusted through the operation of piston rods 43 extending from double-acting pistons in a pair of hydraulic cylinders 44 hingedly attached to the turntable at connections 45 and having the ends of their piston rods 43 hinged at connections 46 to corresponding points of the sides 21' of the frame 21. The present positioning means for the carriage is essentially such that the piston rods 45 are extended from the cylinders 44 when the tilt frame 21 is disposed in upright position, as in Figure 1, and are withdrawn when the tilt frame is in its generally prone position of Figure 7 in which the frame end furthest from its hinged axis end is arranged to be supported from the turntable 17 in a limiting swung-back position in which it preferably engages a suitable rest provided on the turntable plate 17.

As is brought out in Figures 2 and 3 and 8 and 13, the described rotary adjustments of the turntable 17 through at least a ninety degree angle are arranged to be effected by a hydraulic means in which a reversible hydraulic motor 48 mounted on the turntable 17 at an edge point opposite the turntable ears 17" actuates a drive chain 49 connecting a sprocket 51 on the shaft of the motor 48 and a sprocket 52 provided at the top of a tubular member 53 fixed to the vehicle chassis F and extending freely and axially through the turntable opening 17' and coaxially within the turntable support element 16. In the present structure, the member 53 extends fixedly from a supporting base-plate member 54 which is fixed to and between the frame sides F-1 and F-2 within the element 16 and is provided with an opening 55 in line with the bore of the member 53 which is open at its top. As particularly shown, the hub for the sprocket 52 closely overlies the turntable plate about its opening 17' whereby it may function to prevent a tilting of the turntable on the element 16 which supports the turntable on suitable rolling bearings disposed in a raceway 56 provided at and around the top of the element. It will be understood that the present arrangement provides for rotative adjustments of the turntable 17 by reactively moving the motor 48 thereon about the fixed sprocket 52. By reference to Figures 3 and 7, it will also be noted that the body of the motor 48 is arranged to provide the positioning stop for limiting the lowering of the tilted-back carriage assembly.

Understanding that the various adjustments required for the present load-carrying carriage assembly are all arranged to be hydraulically effected, the control indicated in Figures 12 and 13 is effected from a hydraulic pump 61 which is arranged for actuation from the engine E for providing circulation of an operating liquid through a manifold pipe 62 from which tubes 36' and 41' and 48' respectively extend to suitable three-way control valves 36" and 41" and 48" to and thence to and from the different cylinders 36 and 41 and the motor 48 through tubes 63, the return circulation of the liquid from the valves being effected through a manifold pipe 64 discharging into a common reservoir 65 from which the pump 61 is supplied. Control handles 66 for said valves and the controls (not shown) for the driving of the vehicle by the engine E, are disposed within ready reach of an operator occupying the seat S, whereby the operator is not positioned directly beneath a load supported on the carriage in fore-and-aft relation to the supporting vehicle V and the center of gravity of the load may be disposed in the lowest possible position with respect to the vehicle. Also, and as particularly brought out in Figure 13, the various tube connections between the control valves and the cylinders 36 and 41 and the motor 48 conveniently extend through the passage of the member 53, and are flexible enough and long enough to permit the required ninety degree rotary adjustment of the turntable.

By reason of the provision for the central support of a load on the carriage and across the vehicle while the carriage assembly is upright for loading or unloading operations at the rear of the vehicle, no lateral tilting of the vehicle is then urged by the load on the carriage, whereby to avoid any need for the usual jack-supported lateral "outrigger" arms for side-loaded vehicles. On the other hand, a suitable jack means might be advantageously provided and applied directly between the rear vehicle frame end and the ground for supporting and steadying the rear frame portion independently of the rear wheels W-2 while the carriage supports the load across the rear of the vehicle whereby to then avoid any urge for the lifting of the front of the vehicle about the bearing line of the rear wheels W-2, and so eliminate any need for counterweighting the forward end of the vehicle against a "seesaw" tilting of the vehicle by heavier loads, while keeping the vehicle construction at a minimum weight for its duty.

From the foregoing description taken in connection with the accompanying drawings, the advantages of the present loading device for a road vehicle will be readily understood by those skilled in the art to which the invention appertains. While I have shown and described a structure and arrangement which I now consider to be a preferred embodiment of my invention, I desire to have it understood that the showings are primarily illustrative, and that such changes and developments may be made, when desired, as fall within the scope of the following claims:

I claim:

1. In a vehicular transfer unit of the class described, an elongated vehicle, a lift fork having mutually coplanar load-supporting arms extending transversely and rigidly from a planar frame, a carriage supporting said fork frame for its rectilinear adjustment thereon, a turntable carried by the vehicle for its rotative adjustment about a fixed upright axis through a central longitudinal vehicle line, and means adjustably and hingedly mounting said carriage on the turntable for its swinging adjustment about a horizontal axis fixedly related to the turntable and its rotation with the turntable between a loading position in which the fork arms are extended for loading engagement beneath an elongated load article horizontally disposed transversely of the vehicle and an angularly tilted-back load-transporting position in which the load article is cradled between the fork arms and frame in overlying relation to the said vehicle line.

2. A structure in accordance with claim 1 having a power means provided on the vehicle for effecting the aforesaid adjustments of the fork on the carriage and of the carriage on the turntable and of the turntable on the vehicle.

3. In a vehicle for transporting a rigid elongated load article which has a length constantly exceeding the width of the vehicle, a lift fork having mutually spaced and cooperative load-supporting arms extending transversely and rigidly from a support frame, a carriage supporting said fork frame for its rectilinear adjustment along the carriage, a turntable carried by the vehicle for its rotative adjustment about a fixed upright axis through a central longitudinal vehicle line, and means adjustably and hingedly mounting said carriage on the turntable for its swinging adjustment about a horizontal axis fixedly related to the turntable axis and for a rotation of the carriage with the turntable between a loading position in which the fork arms are extended for loading engagement beneath the load article centrally thereof while the article is disposed transversely of the vehicle and an angularly tilted-back load-transporting position in which the load article is cradled upon the fork arms and frame in longitudinally overlying relation to said vehicle line.

4. A structure in accordance with claim 3 having hydraulic power devices provided on the vehicle for selectively effecting the aforesaid adjustments of the fork on the carriage and of the carriage on the turntable and of the turntable on the vehicle.

References Cited in the file of this patent

UNITED STATES PATENTS

| | | |
|---|---|---|
| 1,978,170 | Roesner | Oct. 23, 1934 |
| 2,621,811 | Lull | Dec. 16, 1952 |
| 2,677,476 | Bebinger | May 4, 1954 |
| 2,724,522 | Phebus | Nov. 22, 1955 |
| 2,780,377 | Glenn, Jr. et al | Feb. 5, 1957 |